June 12, 1923.

M. O. REHFUSS

CHAIN MAKING MACHINE

Filed May 8, 1920

Inventor.-
Martin O. Rehfuss.
by his Attorneys-
Howson & Howson

June 12, 1923.
M. O. REHFUSS
1,458,851
CHAIN MAKING MACHINE
Filed May 8, 1920
6 Sheets-Sheet 2
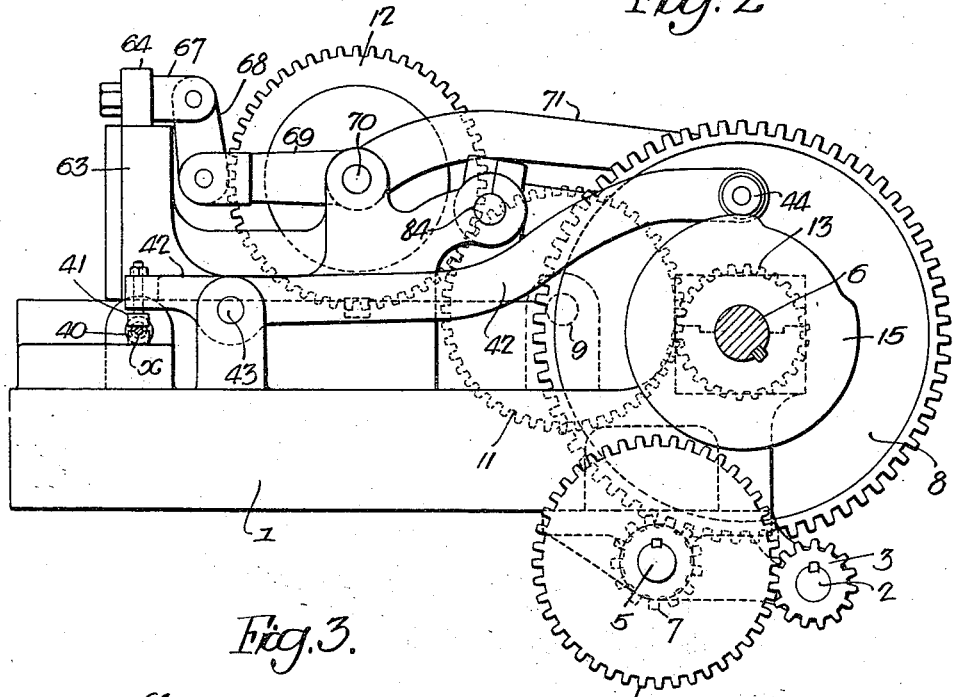
Fig. 2
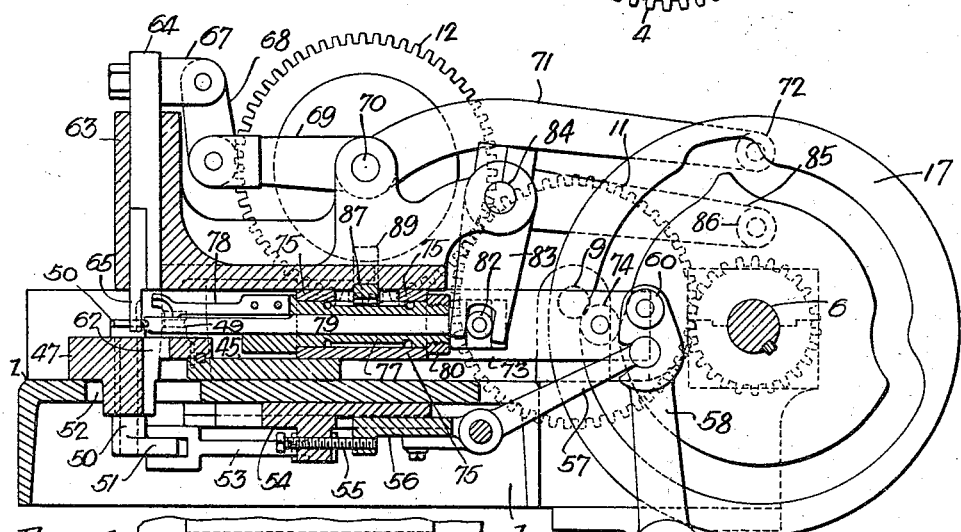
Fig. 3.
Fig. 4.
Inventor—
Martin O. Rehfuss.
by his Attorneys.
Howson & Howson

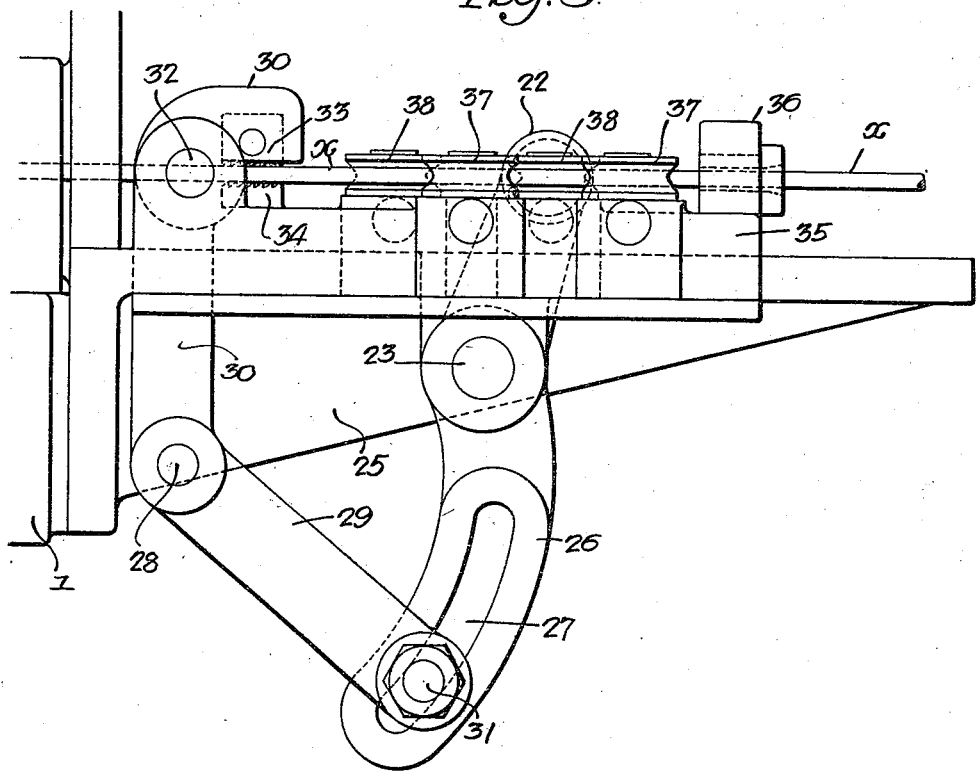

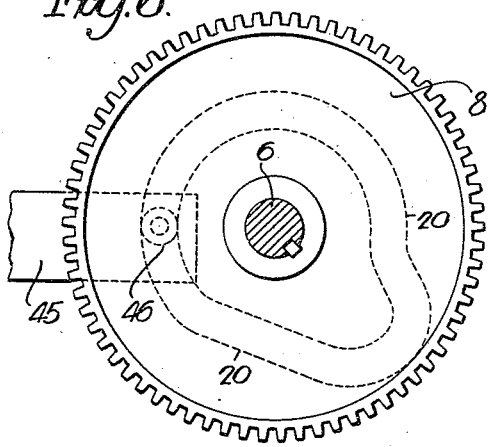
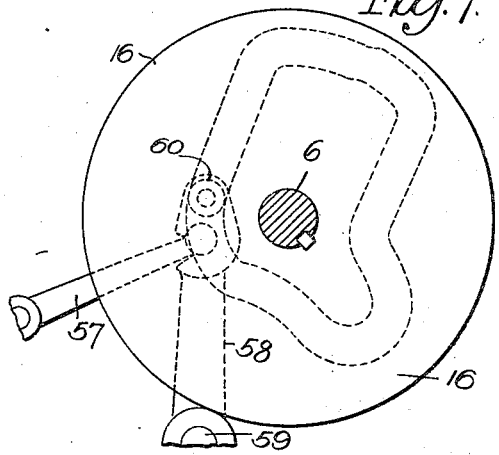
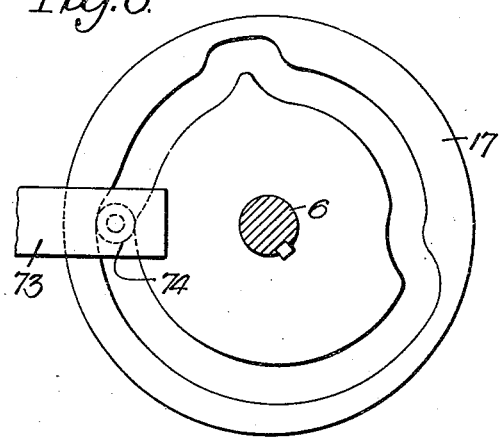
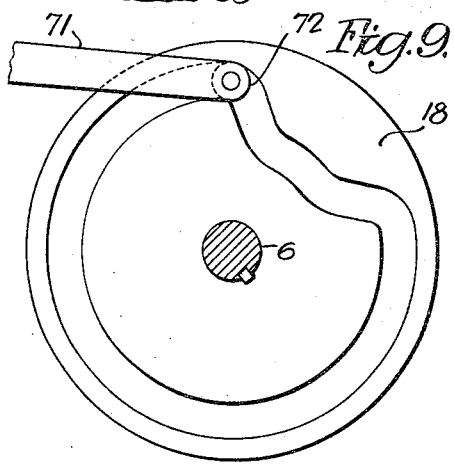
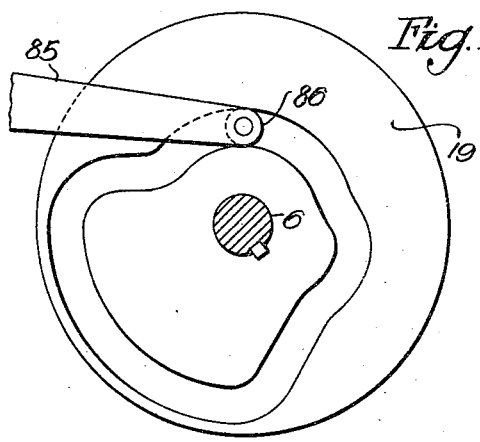

June 12, 1923.
M. O. REHFUSS
CHAIN MAKING MACHINE
Filed May 8, 1920
1,458,851
6 Sheets-Sheet 5
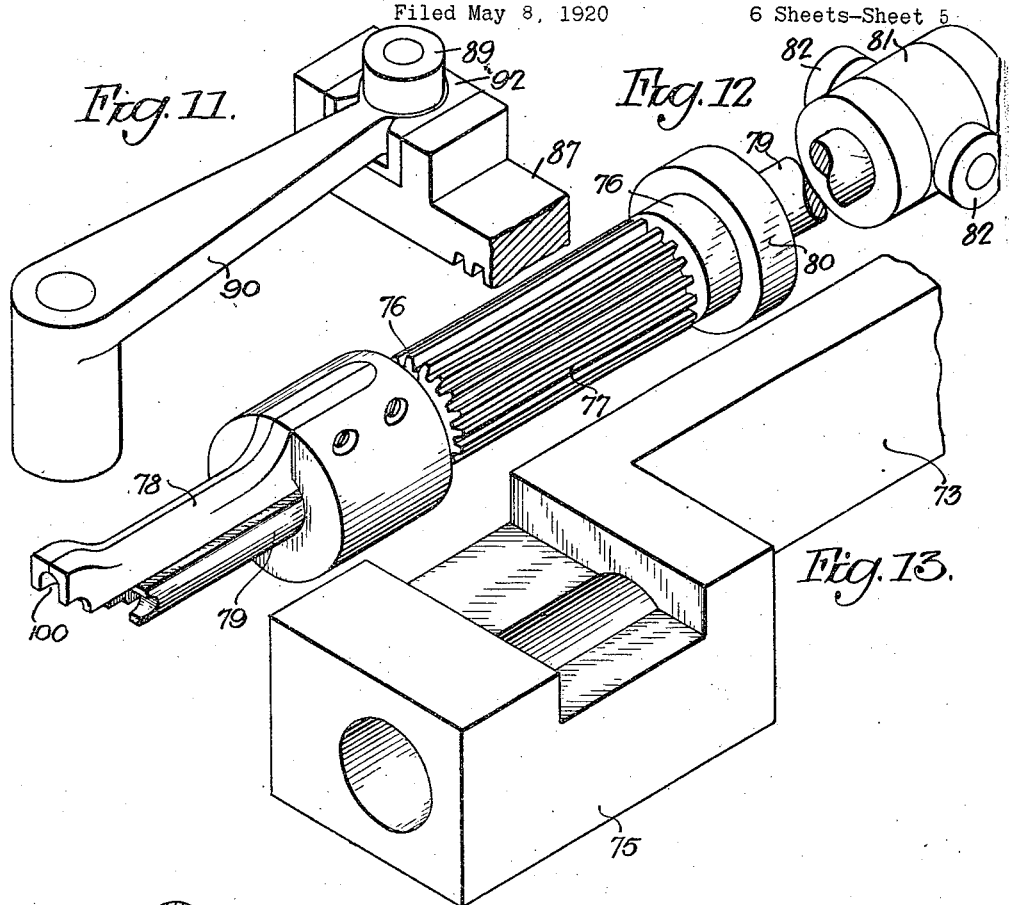
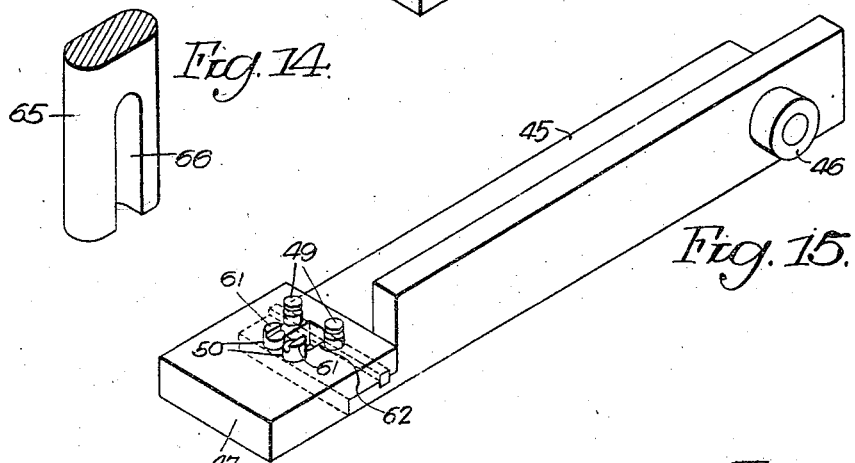
Inventor.
Martin O. Rehfuss.
by his Attorneys.
Howson & Howson

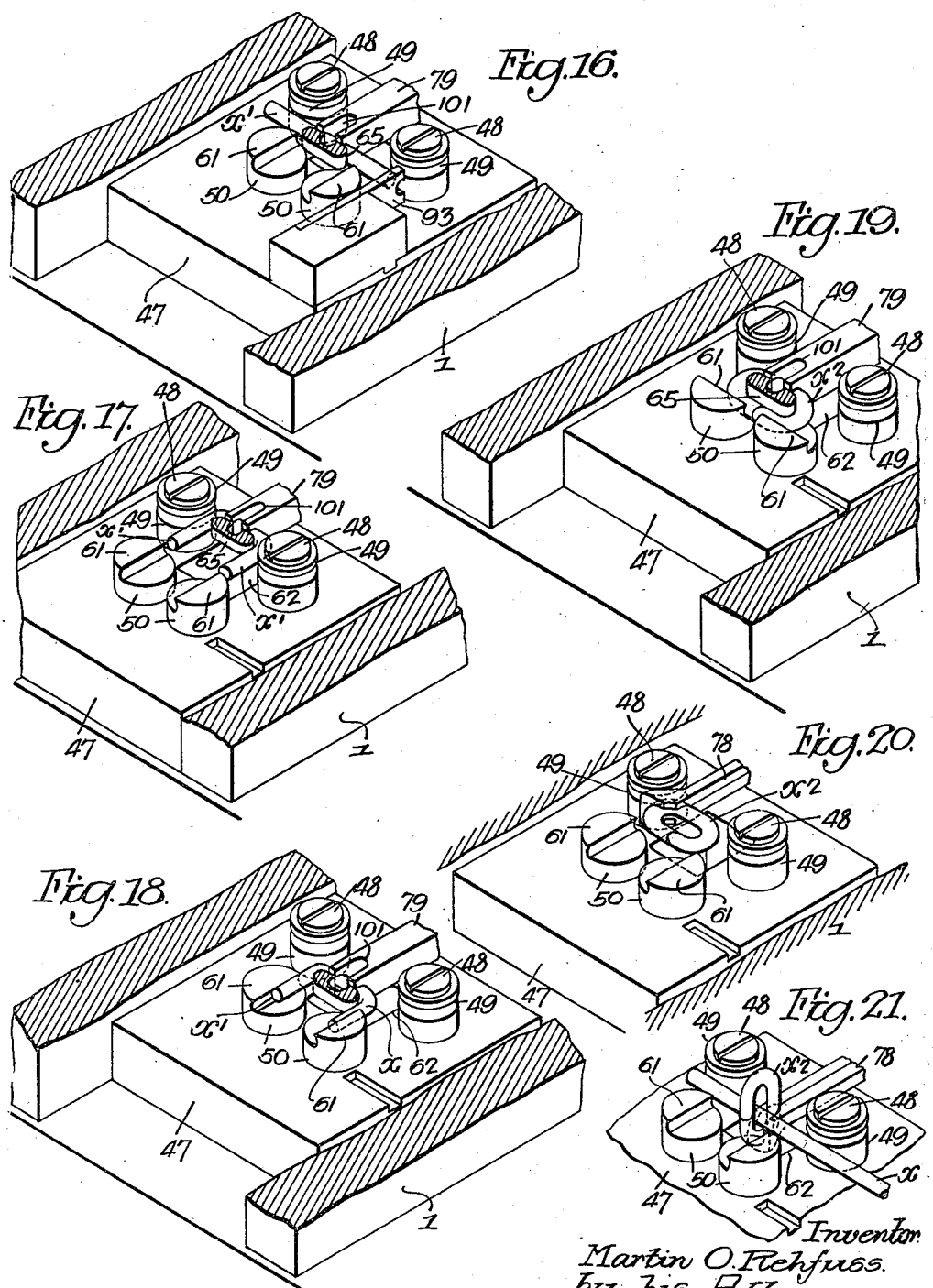

Patented June 12, 1923.

1,458,851

UNITED STATES PATENT OFFICE.

MARTIN O. REHFUSS, OF PHILADELPHIA, PENNSYLVANIA, ASSIGNOR TO UNITED STATES CHAIN AND FORGING COMPANY, OF PITTSBURGH, PENNSYLVANIA, A CORPORATION OF PENNSYLVANIA.

CHAIN-MAKING MACHINE.

Application filed May 8, 1920. Serial No. 379,790.

*To all whom it may concern:*

Be it known that I, MARTIN O. REHFUSS, a citizen of the United States, residing in Philadelphia, Pennsylvania, have invented Chain-Making Machines, of which the following is a specification.

One object of my invention is to provide a machine of the type described and claimed in my application for U. S. Patent No. 282,703, filed March 14, 1919, which shall include a relatively simple, substantial and compact arrangement of parts for automatically forming continuous lengths of chain from links which shall be of greater mechanical perfection than has hitherto been possible; the invention especially contemplating novel means for cutting off successive lengths of bar or wire material and forming them into a series of connected links closed at one side.

Another object of the invention is to provide a machine having the above characteristics which shall include a novel device for so manipulating the links as they are successively formed as to permit each of them to have threaded into it the length of bar material which is to be formed into the next following link;—the mechanism contemplating a simple and substantial device for grasping each link after its formation and thereafter turning it on a transverse axis through an angle of 90 deg. so that a straight length of wire from which the succeeding link is to be formed, may be threaded through it previous to the forming operation.

The invention further contemplates novel mechanism for causing a former-carrying slide to cooperate with a king post to bend a succession of lengths of rod material and form the same into a chain whose links shall have their ends perfectly abutted and that without denting or otherwise marring the wire of which they are made.

These objects and other advantageous ends I attain as hereinafter set forth, reference being had to the accompanying drawings, in which, Figs. 1 and 2 are respectively a plan and a side elevation of a chain making machine constructed in accordance with my invention;

Fig. 3 is a vertical section on the line 3—3, Fig. 1;

Fig. 4 is an inverted plan of a portion of the machine shown in Fig. 3;

Fig. 5 is a side elevation of the wire straightening and feeding mechanism on a larger scale than that of the preceeding figures;

Figure 1:
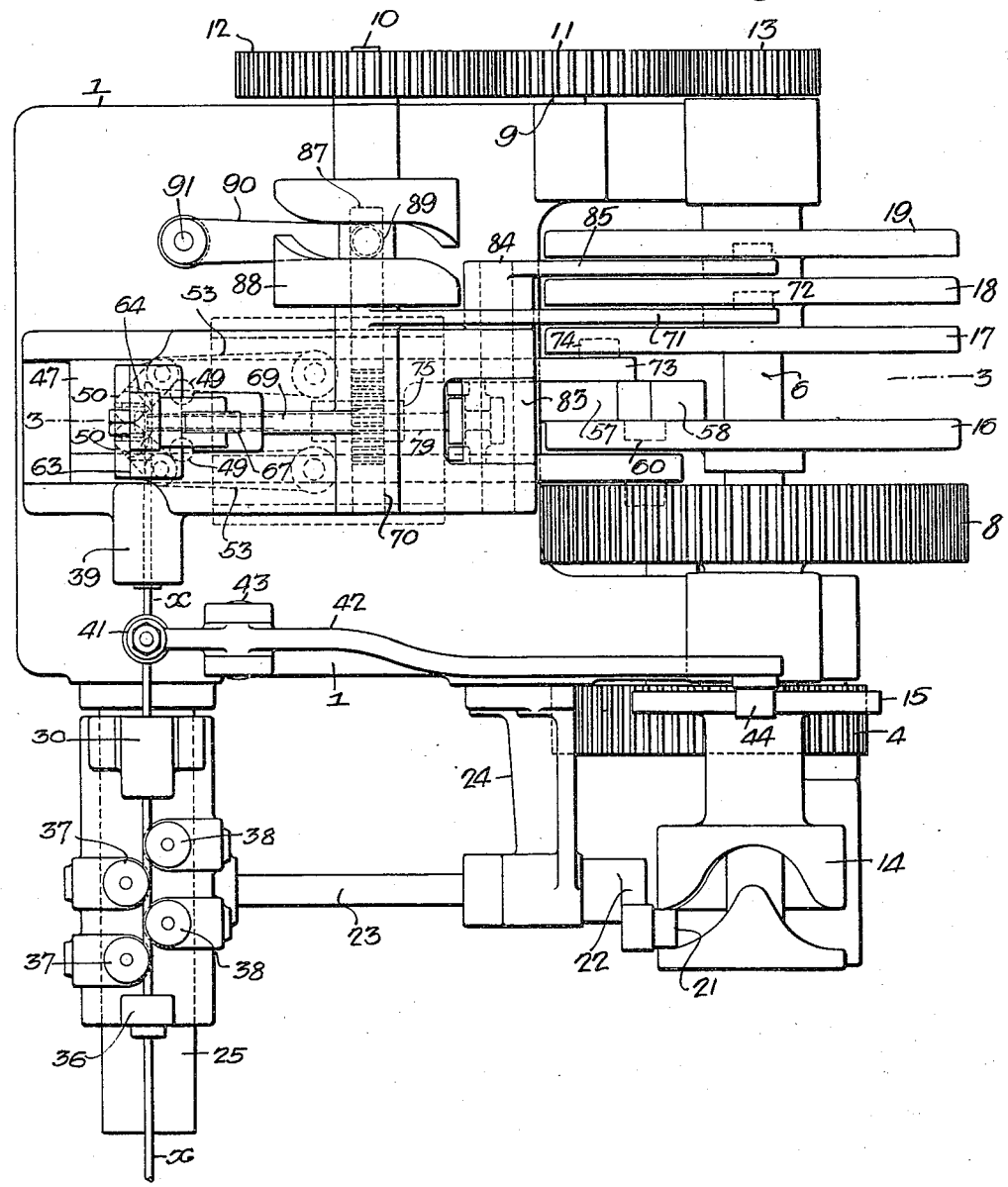

Figs. 6 to 10 inclusive are side elevations of certain of the cams forming part of my machine;—their supporting shafts being shown in section;

Figs. 11 to 14 inclusive are perspective views illustrating on a somewhat enlarged scale, the detail construction of the link reversing mechanism and certain associated parts;

Fig. 15 is a perspective view of the main slide forming part of my machine; and

Figs. 16 to 21 are perspective views to some extent diagrammatic, illustrating the operation of my machine.

In the above drawings 1 represents a frame structure providing or having associated with it bearings for a shaft 2 driven from any suitable source of power and having fixed to it a pinion 3 in mesh with a gear wheel 4 fixed to a second shaft 5. The latter like the driving shaft 2 is mounted in bearings projecting downwardly from the main portion of the frame 1, whose rear upper part also provides bearings for a main or cam shaft 6 driven from the shaft 5 through a pinion 7 thereon and a relatively large gear wheel 8.

On one side of the frame 1 are provided bearings for two relatively short shafts 9 and 10 having fixed to them coacting gears 11 and 12 of which the first is driven by a gear 13 fixed to the adjacent end of the main shaft 6 at the rear of the machine. Said main shaft has fixed to it a series of cams 14—19, in addition to which the web of the gear 8 is formed to constitute a cam 20. Coacting with the groove of the cam 14 is a roller 21 mounted on the end of an arm 22 fixed to a shaft 23 carried in bearings provided in brackets 24 and 25 projecting at the right hand side of the main frame 1.

The front end of the shaft 23 has fixed to it a downwardly projecting arm 26 formed with a longitudinally extending slot 27 curved concentrically with a pivot pin 28. This pin serves to connect a link 29 with a downwardly projecting arm 30 fixed to a spindle 32 journalled on a carriage 35 slidable on the bracket 25 toward and from the frame 1, and the second arm of said link 29 carries a bolt 31 adjustable in the slot 27, whereby said link may be clamped to the arm 26 at varying distances from its shaft 23 so as to vary the stroke of the carriage 35. The slide 35 also has mounted on it a guiding die 36 and four straightening rollers 37—37 and 38—38 so arranged as to cooperate with said die 36 and a guideway 39 on the main frame 1 to define a straight passage way for said wire.

Immediately adjacent the lever 30 I provide on the upper face of the frame 1 a wire clamping device consisting of a lower die 40 fixed to said frame, and a movable upper die 41 carried upon the short arm of a lever 42 fulcrumed to the frame at 43. The long arm of this lever is provided with a roller 44 positioned to coact with the edge of the cam 15, and the arrangement is such that the wire $x$ is gripped and immovably held by the dies 40—41 during approximately three quarters of the revolution of the main shaft 6.

The mechanism is so timed that while the wire is thus held, the cam 14 causes a movement of the shaft 23, and such movement of the arm 26, as not only causes the jaws 33—34 to release the wire but moves the carriage 35 bodily outward away from the frame of the machine and from the clamping device 40—41 with the result that the rollers 37—38 act upon and straighten a definite length of said wire. When the wire is released from the grip of the dies 40 and 41, the shaft 23 causes the jaws 33—34 to grip the wire and move it with the carriage 35 toward the frame of the machine, thus feeding a definite length thereof toward the link forming mechanism hereafter described.

Mounted in a guideway formed in the center of the main frame 1 so as to be reciprocable toward and from the front of the machine, is an elongated slide 45 having adjacent its rear end a roller 46 operative in the groove 20 formed in the web of the gear wheel 8 (Figs. 1, 6 and 15).
At the forward end of this slide is fixed a block 47 carrying a pair of short vertical spindles 48 to which are journalled grooved rollers or posts 49. In front of these posts and at a less distance apart are two other vertically extending posts 50 and these are extended completely through the block 47 beyond the lower face thereof where they have respectively fixed to them arms 51; the block 47 being preferably extended down through an elongated slot 52 in the frame 1 (Fig. 3) to provide ample bearing surface and support for these spindles.

Each of the arms 51 has its free or rearwardly projecting end pivotally connected or pinned to one end of a link 53 and both of these links are pivoted to a slide 54 movable in suitable guideways provided on the under face of the frame 1 so as to be reciprocable toward and from the front of the machine. This slide 54 is adjustably connected through a screw 55 to a block or plate 56 which is pinned to one end of a connecting rod 57 whose second end is hinged to an arm 58 loosely mounted on the shaft 59.
Said arm carries a roller 60 operative in the groove of the cam 16 (Fig. 7) and the arrangement is such that its movement by said cam causes reciprocation of the slide 54 in its guides and periodic oscillation of the posts 50 in opposite directions. Obviously the positions of these posts may be adjusted independently of the cam 16 and of the arm 58 by means of the screw or bolt 55, and their upper ends are semi-cylindrical in form, each having a semi-circular portion of its otherwise flat end removed for a thickness or depth equal substantially to the thickness of the wire being operated on. Each of said posts is thus provided with a semi-cylindrical projecting portion 61 whose straight side or edge is semi-cylindrically grooved to fit the wire $x$.

Between the posts 49 and 50 the block 47 is cut away to provide a vertical passage 62 and above this passage is mounted a standard 63 providing a vertical guideway for a reciprocable head 64 on whose lower end is mounted a king post 65. This king post has a transversely elongated section the same in outline as the opening through the link which it is desired to form and in its rear face has a vertically extending slot 66 of semi-cylindrical section whose width is substantially the same as that of the wire operated on (Fig. 14).

For actuating the head 64 and king post 65 I provide a rearwardly extending lug 67 at the upper end of said head and through a link 68 connect this to the adjacent end of an arm 69 fixed to a spindle 70 to which is also fixed a rearwardly extending and longer arm 71 carrying at its free or rear end a roller 72 cooperative with the groove of the cam 18 (Figs. 1 and 9).
Slidably mounted on and movable parallel with the slide 45 is a second slide 73 whose rear end has fixed to it a roller 74 operative in the groove of the cam 17. The forward end 75 of this slide has bearings for cylindrical portions 76 of a rotary member including a toothed portion constituting an elongated gear 77. This member also includes a forwardly projecting holding finger 78 whose extremity is offset and recessed to receive and frictionally hold a formed link (Figs. 20 and 21). This arm is made of two resilient parts separated laterally at their link engaging ends so that they may yieldingly grip each link at one end thereof. Within the rotary member is mounted a longitudinally movable holding bar 79 whose forward extremity is recessed in two directions at right angles to each other in one case to receive the body of a link and in the other case to hold the wire from which it is made against the king post. The rear end of the member 76—77 has threaded on it a collar 80 whereby it is held in the bearings provided by the slide 73. The rear end of the bar 79 has mounted on it a head 81 having rollers 82 at its opposite sides for engagement with the forked lower end of an arm 83, (Fig. 3) fixed to a spindle 84 on which is also fixed a rearwardly extending arm 85 carrying a roller 86 operative in the groove of the cam 19 (Fig. 10).

As shown in Fig. 3, the housing or bracket structure 63 is formed to provide a guideway for a rack 87 whose teeth mesh with those of the gear 77 and which is operable in a line transversely of the machine. For periodically actuating this rack, the shaft 10 has fixed to it a cam 88 whose groove is operative on a roller 89 carried by an arm 90 pivoted at 91 to the frame 1. The roller-carrying end of this arm is provided with a head designed to oscillate in a block 92 movably carried by the suitably formed end of the rack 87 so that revolution of the cam 88, while swinging the roller 89 in the arc of a circle concentric with the pivot 91, will impart a straight longitudinal movement to the rack 87 (Fig. 11).

With the construction shown it will be understood that the link holding finger 78 is not only rotatable coaxially with and by means for the gear 77 but is likewise longitudinally movable under the action of the cam 17 and slide 73. In addition, the rod holding spindle 79 is longitudinally movable under the action of the cam 19 on the arm 85 while being rotatable with the gear 77 and finger 78. As indicated in Fig. 16, the block 47 of the slide 45 carries a cutter 93 (Fig. 16) so positioned that when said slide is moved rearwardly after a length $x^1$ of wire has been properly fed in front of the grooved posts 49, it is cut off to the length necessary to make a link of the desired dimensions.

With the above described arrangement of parts, the wire $x$ of which the links are to be made, is led through the die 36 between the two pairs of rollers 37—38, between the gripping jaws 33 and 34, between the holding dies 40 and 41, and through the guide 39. Power may then be applied to the machine through the shaft 2, with the result that the various parts are put in motion and among them the cam 14 so acts through the arm 22, shaft 23 and arm 26 as to move the carriage 35 with its associated parts outwardly away from the frame 1 shortly after the die 41 has been moved toward the die 40 by the action of the cam 15 on the arm 42, to clamp or hold the wire from moving. Owing to the action of the rollers 37 and 38, a certain length of the wire 6 is straightened and at the completion of the outward stroke of the carriage 35, the action of the cam 14 first causes the jaw 33 to coact with the jaw 34 (Fig. 5) to grip the wire and thereafter move it with the carriage 35 toward the main frame of the machine.

As a result a predetermined length of the wire is fed through the guide 39 between the two sets of posts 49 and 50, and this is gripped between the king post 65 and the holding bar 79 whereupon the slide 47 is moved to the rear under the action of the cam 20 of the gear 8. The cutter 93 then first severs a length of wire $x^1$ from the main portion thereof (Fig. 16) and the block 47 is moved forwardly, causing the posts 49 to bend the ends of the wire piece $x^1$ at right angles to the body thereof and around the king post 65 (Fig. 17). The rearward movement of the block thereupon brings the parallel edges of the shoulders 61 of the posts 50 into engagement with or immediately adjacent to the outer sides of these bent over the ends (Fig. 18).

Under the action of the cam 16 on the arm 58, the slide 56—54 is now moved forwardly, causing the links 53 to so act on the arms 51 as to rotate the posts 50 toward each other through angles of substantially 90 deg. The two ends of the previously bent length of wire are thus farther bent around the king post 65 and, the wire being of the proper length, are so closed or brought together as to lie in contact (Fig. 19) thus completing the link, $x^2$.

While the latter is still supported by the king post 65 and ends of the posts 50, the holding bar 79 is withdrawn and the finger 78 is turned through an angle of 90 deg. by the action of the cam 88 on the rack 87 and gear 77, so that its end recess 100 (Fig. 12) lies immediately adjacent one end of the link and in the plane thereof. The slide 73 is then moved forward under the action of the cam 17, causing the pieces constituting said finger 78 to be sprung apart and grip the end of the link (Fig. 20), and the king post is raised clear of the link while the block 47 is moved forward. The posts 50 are thereupon turned in opposite directions through angles of 90 deg. back to their former positions and the gear 77 with the link engaging finger 78 is turned so that the link, from lying in a horizontal plane, is moved into a vertical plane, directly in the line of feed of the wire $x$. The parts are so timed that a predetermined length of the latter is now fed forward through the formed link $x^2$ and is severed by the cutter 93 from the main body of wire as before described.

The rearward movement of the slide 73 with the gear 77 and finger 78 now allows the formed link to drop into the opening 62 of the block 47, where it hangs from the cut off length of wire which is supported on the top surface of the block. The holding bar 79 is now moved forward to grip this cut off length $x^1$ against the lower end of the king post 65 as in Fig. 16, and the previously formed link $x^2$ rests in the recess 66 of said post and in the vertical slot 101 of said finger.

The above described cycle of operations is thereupon repeated and a second link is formed as above described, the first formed link hanging from its lower end against the end of the finger 78 when the latter swings it into the position shown in Fig. 21. Continued operation of the machine thus forms an indefinite length of chain made up of links, each of which is perfectly closed, and it is noted that the cutter 93 severs the wire with a clean flat cut so that in the completed link there is practically no space between the two opposed ends. It is further to be noted that the mechanism as a whole is relatively simple, compact and substantial without any parts of such a nature as to be likely to get out of order or require more than minimum attention under conditions of prolonged operation.

I claim:—

1. The combination in a chain making machine of a slide having two sets of posts; a king post; means for feeding a predetermined length of wire between said two sets of slide carried posts; means for actuating said slide to cause one set of posts to bend the ends of said wire about the king post into substantial parallelism; and means for rotating the second set of posts to further bend said ends to complete the link.

2. The combination in a chain making machine of a slide having two sets of posts; a king post; means for feeding a predetermined length of wire between said two sets of slide carried posts; means for actuating said slide to cause one set of posts to bend the ends of said wire about the king post into substantial parallelism; means for rotating the second set of posts to further bend said ends to complete the link; and means for turning the link through 90 deg. into position to receive a length of wire for another link.

3. The combination of a slide; two pairs of posts thereon; means coacting with said posts to form a chain link and support it in a space between them; and means for feeding a predetermined length of wire through said link preparatory to forming it into a second link.

4. The combination in a chain making machine of mechanism for forming a succession of links from lengths of wire and supporting them one at a time in a horizontal plane; a single oscillatory holding finger positioned and formed to engage one end of each formed link; and means for actuating said finger to turn such link through 90 deg. to receive a subsequent length of wire.

5. The combination in a chain making machine of mechanism for forming a succession of links from lengths of wire, the same including a reciprocatory holding finger and a link turning member split to receive a link, said member being rotatably coaxial with and to one side of said holding finger; with means for reciprocating and other means for oscillating said member.

6. The combination in a chain making machine of mechanism for forming links from lengths of wire including a king post; a slide having a plurality of bending posts; a reciprocable holding finger coacting with the king post to position a length of wire while it is being acted on by said bending posts; and a member mounted to oscillate coaxially with said first finger and formed to engage an end of each formed link to move it into position to receive a length of wire for a subsequent link.

7. The combination in a chain making machine of means for forming a succession of links from lengths of wire including a king post; a reciprocable holding finger coacting with said king post; a longitudinally reciprocable gear rotatably supporting said finger; means for oscillating and reciprocating the gear; a member connected to the gear and formed to engage the end of a link; and means for feeding a length of wire through each link after it has been moved to a predetermined position by said member.

8. The combination in a chain making machine of a slide; posts thereon of which two are rotatably mounted; arms for said latter posts; a second slide made in two adjustably connected parts; links connecting one of the parts of said latter slide with said posts arms; and means operating on the other part of the latter slide to actuate the same and periodically rotate the posts connected thereto.

9. The combination in a chain forming machine of a slide; wire bending posts thereon of which two are rotary; arms for said latter posts respectively; a second slide made in two parts; a threaded member adjustably connecting said parts; links connecting one of said parts with the arms; and means operative on the other part of the slide for actuating said links to oscillate the posts connected thereto.

10. The combination in a chain making machine of two longitudinally movable slides; two pairs of posts mounted on one of said slides; a king post; a gear journalled on the second slide; a holding finger movable through said gear and cooperating with the king post to hold the length of wire being formed; a member connected to the gear and formed to engage one end of a link; with means for periodically oscillating the gear to actuate the member to move the formed link into position to receive the subsequent length of wire.

11. The combination in a chain making machine of mechanism for forming a continuous length of chain from lengths of wire, including means for forming each wire length into a link; a link engaging member formed and positioned to cooperate with one end of the link and consisting of two resilient elements; and means for causing said elements to frictionally grasp each link.

12. The combination in a chain making machine of mechanism for forming a length of chain from a series of lengths of wire including means for forming a link from each length of wire; means for turning each formed link through an angle of 90 deg. including a member made of parallel lengths of spring material recessed at one end to frictionally grip the link at one end thereof; and means for feeding through each turned link a length of wire to form a succeeding link.

13. The combination in a chain forming machine of means for forming a series of lengths of wire into a succession of connected links including a rotatable and reciprocatory gear; means for actuating said gear; two resilient elements carried by the gear and having their free ends recessed and laterally offset to receive and frictionally grip each formed link at one end only.

14. The combination in a chain forming machine of means for forming a succession of links; means for grasping each link adjacent one end only and thereafter turning it through a predetermined angle; with means for feeding through each link after it has been turned a length of wire material to form a succeeding link.

15. The combination in a chain making machine of means for forming a succession of links including a guideway; a carriage slidable thereon; a lever pivoted on the carriage and bodily movable therewith; clamping jaws on the carriage and lever respectively; with means for actuating the lever to cause it to first clamp the wire between said jaws and thereafter bodily move said wire with the carriage.

16. The combination in a chain making machine of means for forming a succession of links including a guideway; a carriage slidable thereon; a lever pivoted on the carriage and bodily movable therewith; clamping jaws on the carriage and lever respectively; means for actuating the lever to cause it to first clamp the wire between said jaws and thereafter bodily move said wire with the carriage; with means for adjusting the distance moved through by the carriage.

17. The combination in a chain making machine of means for forming a succession of links including a guideway; a carriage slidable thereon; a lever pivoted on the carriage and bodily movable therewith; clamping jaws on the carriage and lever respectively; means for actuating the lever to cause it to first clamp the wire between said jaws and thereafter bodily move said wire with the carriage, the same including a link pivoted to one arm of the lever and an oscillatory arm having a slot curved concentrically with the pivot between the link and the lever; with means operative in said slot for connecting the link to said arm at varying distances from the center of oscillation of the latter.

MARTIN O. REHFUSS.